United States Patent [19]

Rietsch

[11] Patent Number: 4,875,197

[45] Date of Patent: Oct. 17, 1989

[54] METHOD AND APPARATUS FOR DETERMINING PROPAGATION VELOCITIES OF ELASTIC WAVES IN A BOREHOLE

[75] Inventor: Eike Rietsch, Houston, Tex.

[73] Assignee: Texaco Inc., White Plains, N.Y.

[21] Appl. No.: 462,169

[22] Filed: Jan. 31, 1983

[51] Int. Cl.4 .............................................. G01V 1/40

[52] U.S. Cl. ........................................ 367/32; 367/25; 367/34; 340/870.13

[58] Field of Search ........................ 367/32, 27, 60, 34, 367/48, 47, 58, 28, 912, 59, 78, 80; 181/102, 105; 340/857, 858, 870.15, 870.13, 870.12; 370/90, 96

[56] References Cited

U.S. PATENT DOCUMENTS 3,369,182 2/1968 Reindl ............................ 340/870.13
4,419,748 12/1983 Siegfried, II .......................... 367/32

OTHER PUBLICATIONS

"Elastic-Wave Velocity Measurements . . . ," Geophysics, vol. 40, #6, Dec. 1975, pp. 955–960.

*Primary Examiner*—Thomas H. Tarcza
*Assistant Examiner*—Ian J. Lobo
*Attorney, Agent, or Firm*—Robert A. Kulason; Ronald G. Gillespie

[57] ABSTRACT

A method of measuring the propagation velocity of one or more of a plurality of different types of elastic waves in a borehole. It employs a source of elastic waves at a given location in a borehole. The elastic waves generated have a given known frequency. There are a plurality of receivers spaced at different distances from the source. The signals developed by the receivers are digitally multiplexed at a high scan rate relative to the generated frequency. Then the multiplexed signals are analyzed to determine the wave lengths of the received signals. From the wave lengths the propagation velocities, v, may be computed by using the fundamental relationship $v = f\lambda$, in which f is the frequency and $\lambda$ is the wave length.

5 Claims, 3 Drawing Sheets

METHOD AND APPARATUS FOR DETERMINING PROPAGATION VELOCITIES OF ELASTIC WAVES IN A BOREHOLE

FIELD OF THE INVENTION

This invention concerns velocity logs, in general. More specifically it relates to determination of propagation velocities of elastic waves in a borehole.

BACKGROUND OF THE INVENTION

In the past, measurements of propagation velocities of elastic waves in boreholes have been carried out in order to determine a characteristic of the formations down hole. Such measurements are of interest to geophysicists and geologists. Various logging tools are known and have been used to measure the propagation velocity of compressional waves (P-waves) in the formation surrounding the borehole. Also, more recently, shear wave seismics has made measurement of the propagation velocity of that type of waves an important objective.

The various logging tools which have been employed heretofore have made direct measurements of the velocity of compressional waves. For example, a logging sonde would have a source of acoustic energy transmit a short signal which propagated within a bore hole and in the surrounding rock. That signal would reach two spaced receivers along several paths. Since the path to reach the furthest one was longer by the distance between them, the propagation velocity was related to the arrival time difference. In practice, the meaurement was modified in several ways to correct for hole irregularities etc. However, sophisticated circuitry was required to reliably detect the first arrival of the signals transmitted by the source. Furthermore, event stretch or in extreme cases cycle skipping have been among the difficulties encountered which could lead to erroneous measurements.

Another difficulty has been the problem of detecting later arrivals. Shear wave velocities are lower than pressure or P-wave velocities, and the superposition of several other later arriving waves, e.g. mud waves and Rayleigh waves makes shear wave arrivals difficult to detect.

Consequently, it is an object of this invention to teach a method and apparatus for measuring the wave length of arriving signals and from such measurement to determine the propagation velocity thereof.

SUMMARY OF THE INVENTION

Briefly the invention relates to a method of determining the propagation velocity of elastic waves in a borehole. It comprises the steps of generating elastic waves having a predetermined frequency at a predetermined location in a borehole, and receiving said elastic waves at a plurality of locations in said borehole spaced at different distances from the location where said waves were generated. It also comprises recording an instantaneous value of said received elastic waves at each of said plurality of locations at a predetermined instant of time, and measuring the wave lengths from said recorded instantaneous values whereby the velocity of said propagated elastic waves may be determined.

Again briefly, the invention concerns a method of determining propagation velocities of a plurality of different elastic waves in a borehole. It comprises, generating said plurality of different elastic waves over a broad band of frequencies at a predetermined location in said borehole. Receiving signals from said elastic waves at a plurality of locations spaced at predetermined distances from said generating location, and narrow band-pass filtering said signals. It also comprises means digitally multiplexing said signals at a high scan rate relative to said broad band of frequencies, and recording said multiplexed signals. It also comprises analyzing said recorded signals to determine the wave lengths of said different elastic waves whereby said propagation velocities may be determined.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein.

DESCRIPTION OF THE PREFERRED EMBODIMENT

Figure 1:
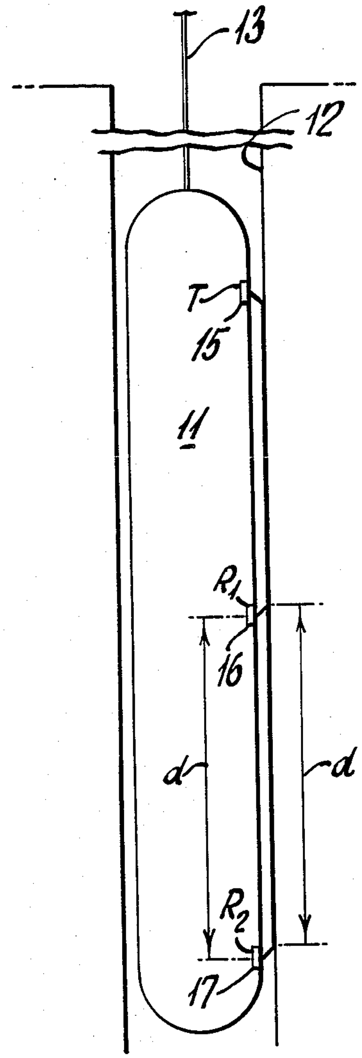
FIG. 1 is a schematic illustration of a logging tool for velocity logging according to the prior art.

Heretofore velocity logging of a borehole has involved apparatus such as that indicated by the FIG. 1 illustration. It employed a logging sonde 11 that was run down in a borehole 12 while attached at the end of a cable 13. The sonde 11 included a transmitter 15 which transmitted a short seismic signal that propagated into the formation surrounding the borehole 12. The signal then reached each of two receivers 16 and 17 along several paths such as the one indicated. The receivers being spaced apart a given distance would provide a basis for determining the propagation velocity of the signal through the formation from the arrival time difference at the two receivers 16 and 17. However, it was difficult to detect the first arrivals of signals being transmitted by the transmitter 15. Even with sophisticated circuitry there were problems with event stretch, or in extreme cases, with cycle skipping which led to erroneous measurements.

Figure 2:
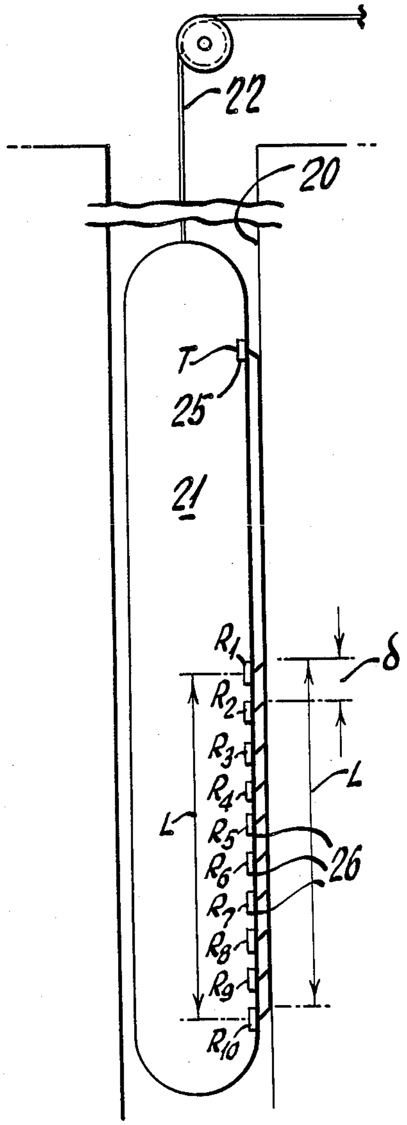
FIG. 2 is a schematic illustration showing a logging tool in a borehole and including a plurality of receivers in order to provide for carrying out a method according to the invention.

A different approach is employed in accordance with this invention. The concept may be understood with reference to FIGS. 2,3 and 4. As schematically indicated in FIG. 2, there is a borehole 20 with a sonde 21 suspended therein at the end of a cable 22. A transmitter 25 is located near one end of the sonde 21, and a plurality of receivers 26 (i.e., $R_1$–$R_{10}$) are spaced apart from one another (preferrably an equal distance) at the other end of the sonde 21. The distance between receivers is indicated by the distance $\delta$ shown in FIG. 2.

With the foregoing arrangement, the wave lengths of different elastic waves generated by the transmitter 25 can be measured, Then, knowing the wave lengths and making use of the fundamental relationship:

$$v=f\lambda \quad (1)$$

wherein v is velocity, f is frequency and λ is wave length, the propagation velocity of the different elastic waves can be determined because they all will have emanated from the same generated signals. Therefore the frequency will be the same.

Figure 3:
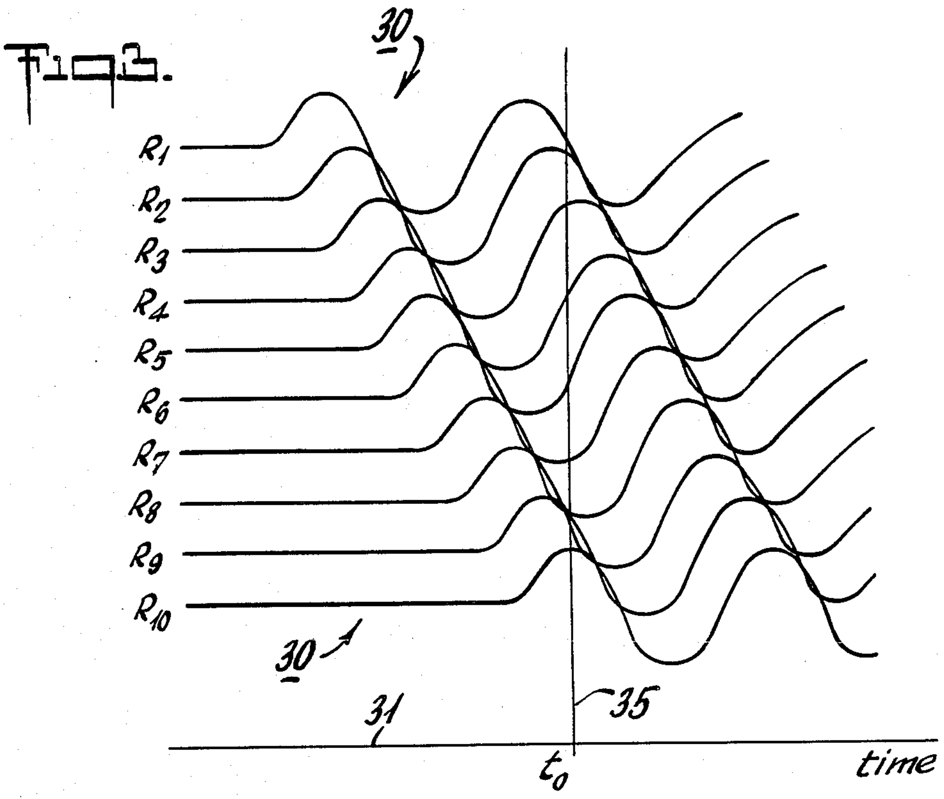
FIG. 3 is a diagram schematically illustrating signals as a function of time as received at the plurality of receivers indicated in FIG. 2.

In order to understand how the wave length measurement is accomplished, reference is made to FIG. 3 where signals received by the receivers 26, i.e. $R_1$–$R_{10}$ (see FIG. 2) are represented by ten wave forms 30. Each of these wave forms or traces 30 represents schematically a signal as a function of time that is received by the corresponding one of the receivers 26 (FIG. 2). Thus, the signals 30 are shown as they might be recorded relative to a time axis 31 (FIG. 3). It will be noted that the signals arrive in sequence beginning with the uppermost receiver 26 ($R_1$).

Figure 4:
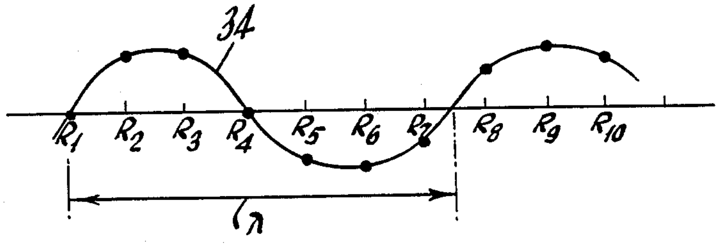
FIG. 4 is a diagram illustrating a wave form developed from a recording, e.g., by multiplexing, of instantaneous values of the signals

However, a multiplexing technique may be employed in making a recording of all of the signals from the receivers $R_1$–$R_{10}$. Then, if the sweep frequency or scan rate used in the multiplexing is high relative to the frequency of the signals from the receivers, a single scan may be considered as recording the instantaneous values of the signals at the receivers $R_1$–$R_{10}$. Such a scan is represented by a vertical line 35 along the time axis 31 illustrated in FIG. 3. It will be understood from the foregoing that a single wave form created by the instantaneous values, would take the form illustrated by a curve 34 in FIG. 4. Clearly, a wave form 34 thus obtained has a wave length lambda (λ) as indicated in FIG. 4. Such wave length may be determined from the spacings of the receivers $R_1$–$R_{10}$ which are located on the sonde 21 (FIG. 2).

It will be understood that (as indicated above) the multiplexing will be carried out at a high scan rate relative to the frequency of the signals generated by the transmitter 25. Also, it will be clear that the wave length can be determined from the multiplexed signals by standard methods of spectral analysis (e.g. Fourier analysis), provided the distance δ (FIG. 2) between adjacent receivers 26 is less than half the wave length of the signal developed, e.g., the signal 34 illustrated in FIG. 4. That relationship may be expressed as:

$$\delta<\lambda/2=v/(2f) \quad (2)$$

Figure 6:
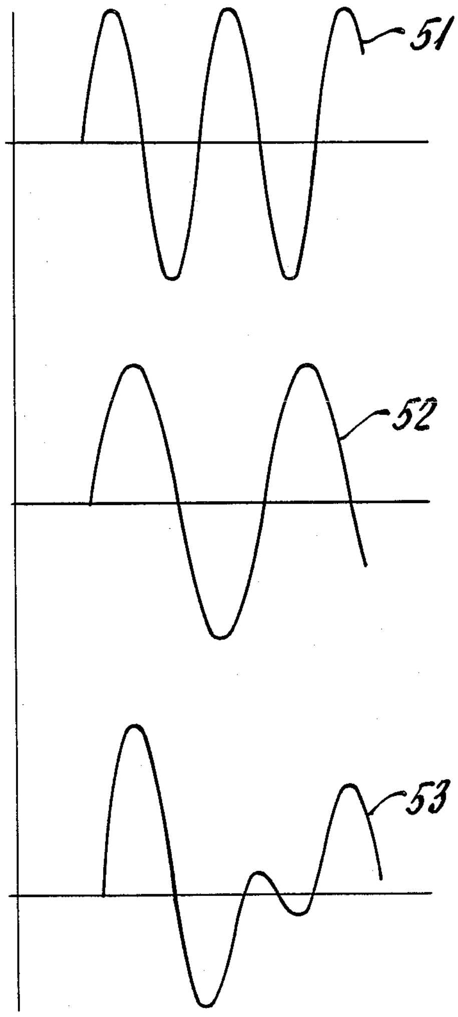
FIG. 6 is an illustration of the superposition of two sine waves having different wave lengths.

As indicated above, the transmitted signal from transmitter 25 will produce a number of different types of elastic waves. Consequently, signals which have traveled different paths with different velocities may arrive at the receivers simultaneously. Therefore the multiplexed signals will be composites containing superimposed sine waves having different wave lengths. An example of the superposition of two sine waves is illustrated in FIG. 6 wherein a signal 53 is a superposition of two sine waves shown above it which are designated by reference numbers 51 and 52. The wave length of the sine wave 51 is $\frac{2}{3}$ of the wave length of the sine wave 52.

It is well known that using an autoregressive estimation technique, the number of receivers required to resolve n different wave lengths may be expressed by the equation:

$$N=2n+1 \quad (3)$$

wherein N is the number of receivers and n is the number of wave lengths. Consequently, the minimum number of receivers required is three, if only one wave length is present. If four sine waves with different wave lengths are superimposed, there will be nine receivers needed to uniquely resolve them.

It will be appreciated that there will be environmental noise when the sonde 21 is in use so that more than the minimum number of receivers 26 should be employed. Alternatively or in addition, other means of noise suppression should be used. The influence of noise can be reduced by scanning the receiver traces or signals 30 (FIG. 3) and digitally recording them several times using a sample interval Δt.

Preferably, the number M of scans of the recorded signals used for computing the wave lengths would be the integer closest to an integer multiple of 1/(fΔt), i.e. in accordance with the equation:

$$M=[K/(f\Delta t)+0.5] \quad (4)$$

wherein K is also an integer. Then when the individual wave lengths in the composite recording have been determined, the velocities of the separate waves may be determined by using the fundamental relationship indicated by equation (1) above, i.e.

$$v_j=f\lambda_j \quad (5)$$

where $v_j$ and $\lambda_j$ are the velocity and wave length of one of the superimposed signals.

In order to obtain good resolution of the different wave lengths, the length L (FIG. 2) of the group of receivers 26 should be at least of the same order of magnitude as the longest wave length. Thus, for example using a maximum velocity of 24,000 ft/sec and a twelve kHz signal transmitted, the length of the receiver array should be about two feet, and, using thirteen receivers the receiver spacing δ would be two inches. Also, in accordance with the relationship (2) above, the lowest velocity that could be determined without aliasing, would be 4000 ft/sec With reference to FIG. 5, it will be understood that the ten signals being received at the receivers 26 (FIG. 2) will be connected to a multiplexer 41. Multiplexer 41 might take various forms so long as it can accomplish the relatively instantaneous recording in a digital manner of the signal amplitudes as developed at the ten receivers 26. It will be appreciated that it must use a high scan rate relative to the frequency of the transmitted signal from transmitter 25 (FIG. 2). It will also be appreciated that the illustration of the invention shown and described in connection with FIGS. 2–5 is only by way of example, and the number of receivers employed may be much higher.

Figure 5:
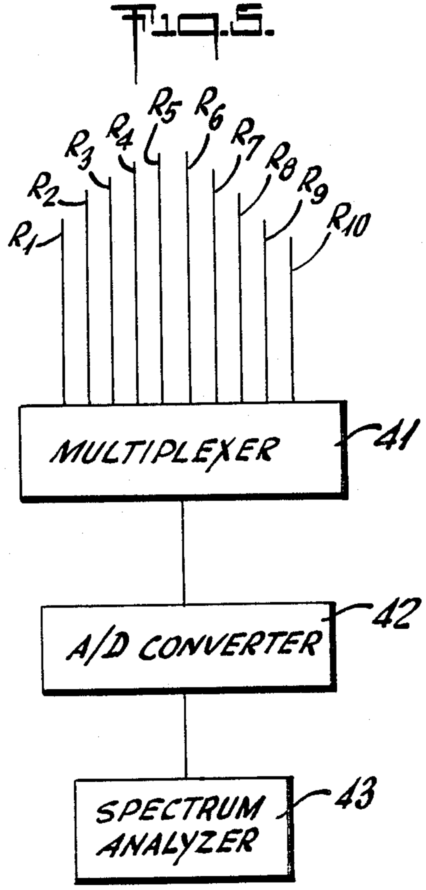
FIG. 5 is a schematic diagram illustrating apparatus that may be employed in handling the signals from a logging tool such as that indicated in FIG. 2.

The multiplexed signals are fed to an analog to digital converter 42. Thereafter, the digital signals are either fed directly to a spectrum analyzer 43 as shown in FIG. 5 or they are stored on magnetic tape (not shown) or some other storing device for later spectral analysis, e.g. by a general or special purpose computer.

While the foregoing description of the invention indicates that the signals recorded by the receivers should be monofrequent, i.e. sign waves, it is also possible to employ a transmitter which radiates a broader spectrum of frequencies or several discrete frequencies, or to employ several transmitters radiating different frequencies. The unwanted frequencies can be removed by narrow band filtering the recorded signals. Also, by filtering the recorded signals with different filters, the velocities can be determined for several frequencies.

If velocities lower than those defined by expression (2) above are known to be possible all recorded signals should be subjected to static time shifts which increase linearly with the transmitter-receiver distance before the wave length is determined. Thus the signal $s_j(t)$ developed by the j-th receiver is shifted to $$s_j(t)\ s_j(t-\tau_j)$$

where $\tau_j$ is proportional to the distance, $d_j$, from the transmitter to the j-th receiver.

$$\tau_j = \frac{1}{v_c} d_j$$

If such a time shift is applied it acts the same way as a reduction of $\delta$.

$$\delta \rightarrow \delta\left(1 - \frac{v}{v_c}\right)$$

While a particular embodiment of the invention has been described above in considerable detail in accordance with the applicable statutes, this is not to be taken as in any way limiting the invention but merely as being descriptive thereof.

I claim:

1. Method of determining propagation velocities of a plurality of different elastic waves in a borehole, comprising generating said elastic waves at a single frequency at a location in said borehole, receiving signals from said elastic waves at a plurality of locations spaced at predetermined distances from said generating location, digitally multiplexing said signals at a scan rate that is high relative to said frequency, recording said multipled signals, and analyzing said recorded multiplexed signals to determine the wave lengths of said different elastic waves by measuring each whereby said propagation velocity of each different elastic wave is determined from the fundamental relationship $v=f\lambda$ where v is velocity f is frequency and $\lambda$ is wave length.

2. Apparatus for determining propagation velocities of a plurality of different elastic waves in a borehole, comprising in combination means for generating said plurality of different waves at a single frequency at a location in said borehole, means for receiving signals from said elastic waves at a plurality of locations spaced at predetermined distances from said generating location, means for digitally multiplexing said signals at a scan rate that is rapid relative to said frequency, means for recording said multiplexed signals, and means for analyzing said recorded multiplexed signals to determine the wave lengths of said different waves by measuring each whereby said propagation velocities may be determined.

3. Method of determining the propagation velocities of a plurality of different elastic waves in a borehole comprising generating said elastic waves over a broad band of frequencies at a location in said borehole receiving signals from said elastic waves at a plurality of locations spaced at predetermined distances from said generating location, narrow band-pass filtering said received signals digitally multiplexing said received signals at a scan rate that is high relative to the highest frequency in said signals, recording said multiplexed signals, and analyzing said recorded signals to determine the wave lengths of said different elastic waves by measuring each whereby said propagation velocity of each is determined from the relationship $v=f\lambda$.

4. Method of determining the propagation velocities of a plurality of different elastic waves in a bore hole comprising generating said elastic waves over a broad band of frequencies at a location in said bore hole, receiving signals from said elastic waves at a plurality of locations spaced at predetermined distances from said generating location, digitally multiplexing said signals at a scan rate that is high relative to the highest frequency in said signals, analog-to-digital converting said signals band-pass filtering said digital broad-band signals by means of several narrow band filters, analyzing each of the narrow band-pass filtered signals to determine the wave length of said different elastic waves by measuring them whereby said propagation velocity of each wave at each narrow frequency band is determined from the relationship $v=f\lambda$.

5. Method according to claims 1 or 3 or 4 wherein the signals from the receivers are shifted in time proportional to their distance from the source either prior or after analog-to-digital conversion.

* * * * *